UNITED STATES PATENT OFFICE.

EUGENE F. JAQUES, OF BURTON, OHIO.

DENTAL ANÆSTHETIC.

SPECIFICATION forming part of Letters Patent No. 418,567, dated December 31, 1889.

Application filed August 24, 1889. Serial No. 321,895. (No specimens.)

*To all whom it may concern:*

Be it known that I, EUGENE F. JAQUES, a citizen of the United States, residing at Burton, in the county of Geauga and State of Ohio, have invented certain new and useful Improvements in Local Anæsthetics; and I do declare the following to be a full, clear, and exact description of the invention, such as will enable others skilled in the art to which it appertains to make and use the same.

My invention is in the nature of an anæsthetic to be applied locally by hypodermic injection, and it is specially designed for use in the extraction of teeth.

In compounding my anæsthetic I take the following ingredients: hydrochloride of cocaine, (*Erythroxylon coca*,) two grains; carbolic acid, (*Acidum carbolicum*,) one minim; oil of winter-green, (*Oleum gaultheriæ*,) three minims; oil of mustard, (*Oleum sinapis*,) one minim; alcohol, (*Spiritus purificati*,) two minims; pulverized boric acid, (*Acidum boricum, pulv.*,) one grain; distilled water, (*Aqua distillati*,) forty-nine minims, and oil of cajeput, (*Oleum cajeputi*,) one minim.

The manner in which I mix and compound these ingredients may be described as follows: I first mix together two minims of alcohol, three minims of oil of winter-green, one minim of oil of mustard, and one minim of oil of cajeput. I then mix together forty-nine minims of distilled water, one grain of pulverized boric acid, one minim of carbolic acid, and two grains of hydrochloride of cocaine, and, finally, I mix the entire mass together.

I apply my anæsthetic locally by means of a hypodermic syringe in the well-known manner, using from two to twelve drops to a tooth, applied to both the inside and outside of the tooth, piercing the gum under the mucous membrane surrounding the tooth, thus producing insensibility to the part applied, enabling the operator to use the lancet, making the tooth more accessible and the operation more sure.

Having thus fully described my invention, what I claim herein as new and of my own invention is as follows:

The herein-described local anæsthetic, consisting of hydrochloride of cocaine, carbolic acid, oil of winter-green, oil of mustard, alcohol, boric acid, distilled water, and oil of cajeput, in about the proportions set forth.

In testimony whereof I affix my signature in presence of two witnesses.

EUGENE F. JAQUES.

Witnesses:
ROBT. H. HICK,
R. N. FORD.